United States Patent [19]

Criswell

[11] Patent Number: 4,943,969
[45] Date of Patent: Jul. 24, 1990

[54] ISOLATION FOR FAILURES OF INPUT SIGNALS SUPPLIED TO DUAL MODULES WHICH ARE CHECKED BY COMPARISON

[75] Inventor: Peter B. Criswell, Bethel, Minn.

[73] Assignee: Unisys Corporation, Blue Bell, Pa.

[21] Appl. No.: 277,074

[22] Filed: Nov. 28, 1988

[51] Int. Cl.$^5$ .............................................. G06F 11/00
[52] U.S. Cl. ................................... 371/68.1; 371/67.1
[58] Field of Search ..................... 371/68.1, 68.2, 68.3, 371/25.1, 67.1; 364/200, 900

[56] References Cited

U.S. PATENT DOCUMENTS

| | | | |
|---|---|---|---|
| 4,309,768 | 1/1982 | Ault | 371/68.3 |
| 4,354,270 | 10/1982 | Nudiny | 371/68.3 |
| 4,366,535 | 12/1982 | Cedolin | 371/68.3 |
| 4,723,245 | 2/1980 | Leslie | 371/68.3 |
| 4,734,687 | 3/1988 | Jones | 371/68.3 |

*Primary Examiner*—Michael R. Fleming
*Attorney, Agent, or Firm*—Glenn W. Bowen; Robert S. Bramson

[57] ABSTRACT

Failures of duplicate input signals to two indentical electronic modules which may be units, cards, circuits or other entity, are detected by comparison. In each electronic module functional input signals are captured in a plurality of latches on different, or the same, clock phase. Each input signal is captured directly in latches on the same phase as the functional latch which used it to provide a plurality of link signals which are encoded by techniques, such as parity or residue encoding, and compared. The result of the link signal comparison is stored in a register. The outputs of the register are encoded and are supplied to a comparator which compares a signal from the other identical electronic modules. When miscomparison occurs location of the type of failue is facilitated by the system.

4 Claims, 2 Drawing Sheets

4,943,969

ISOLATION FOR FAILURES OF INPUT SIGNALS SUPPLIED TO DUAL MODULES WHICH ARE CHECKED BY COMPARISON

BACKGROUND OF THE INVENTION

1. Field of the Invention

This invention relates to the checking of two dual modules, which may be identical circuit cards or other identical electronic units, which are checked by comparison of signals which should be identical. This invention is related to prior co-pending application entitled "System for Checking Duplicate Logic Using Complementary Residue Codes to Achieve High Error Coverage with a Minimum of Interface Signals," Ser. No. 235,425, filed Aug. 24, 1988, in the name of Peter B. Criswell, which is assigned to Unisys Corporation, and is hereby incorporated by reference into this document.

2. Description of the Related Art

Signals from each module are compared against each either directly or through logic which encodes the outputs to reduce the number of signals which pass between the dual modules to be compared. A miscompare between such output signals can be the result of a hardware failure internal to one of the modules, or a failure external to the modules, which results in one module receiving a different value for a signal than the other receives.

In the following discussion such modules will be discussed in terms of printed circuit boards (PCB) interconnected via a backpanel. Each PCB provides the interconnect for Large Scale Integrated (LSI) circuits which are mounted on its surface and the backpanel interconnects numerous boards. If two of these boards are identical and are checked by comparison, they may receive input signals from many of the other boards. When large sections (such as an arithmetic section of a computer) are checked by comparison, they typically compare only outputs from the section, and generally check them only at the end of an instruction sequence.

The nature of comparison checking is that if a miscompare error is detected, the failure can be on either of the dual PCB, or on any of the input links into either dual module. This provides a significant problem to the customer engineer because the list of possible failing boards which can result from a miscompare error can contain many boards.

Additional techniques are required to bring this list to a manageable level. One of the easiest ways to do this, if the input signals are grouped, is to send a parity bit with them. Then the parity checker on the input register can be used to indicate whether or not any of the input signals have failed.

Another technique is to capture certain input signals and stage them so that they can be locked-up when an error is detected. This technique works well for certain types of inputs, such as instruction codes or operands, where their value has meaning only at one particular time for each instruction. When their values are captured on both boards, they are compared, and if the values are equal, it is known that the input links did not fail and the driver boards for those signals do not have to be considered for replacement. If the capture registers are not equal, the associated link isolates the failure to three boards, the two dual LSI boards and a driver board coupled to the two boards. The present invention thus is concerned with the handling of signals which, for various reasons, cannot be detected by this prior capture technique.

SUMMARY OF THE INVENTION

Input signals to two identical boards driven from the same driver module are captured in separate capture latches on each board. This latch is chosen to be gated on the same clock phase as the gate signal for the functional latch which receives the signal. Depending on the delays for the path from all source latches through the link to the capture latch, the capture latch may, or may not, require an enable signal. If some delays are more than the time for one machine cycle, a sync signal (i.e., a signal which differentiates between adjacent clock cycles), may be used for the enable. Another alternative is to use the same enable as the functional latch if the enable contains no signals external to the dual boards. This is less desirable, however, than using a sync control because it introduces more internal logic which can cause a link error detection. It may be necessary to stage the link capture signals which are to be grouped through one additional level to capture them all on the same clock phase. The parity of each group of assigned groups of input link signals is generated and is sent to a compare register section to feed a dual board comparison logic section. In the absence of a link failure, the parities of these corresponding groups will always be equal between the dual boards. When link failure occurs they will not be equal (assuming a single link failure).

DESCRIPTION OF THE PREFERRED EMBODIMENT

Figure 1:
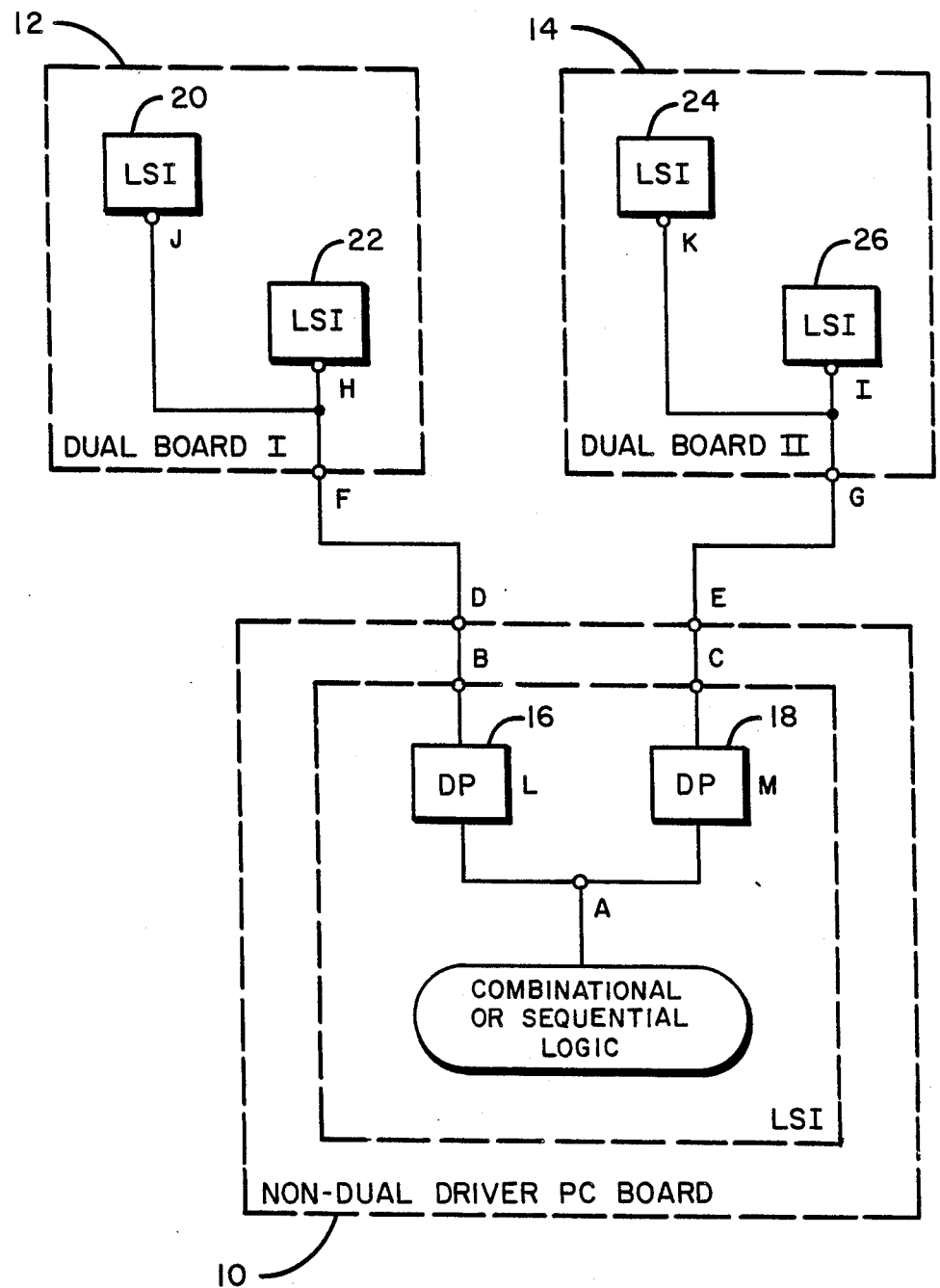
FIG. 1 is a partial schematic view of a driver board and a pair of identical boards which receive signals from the driver board displaying the nature of input links to dual boards.

FIG 1 shows two links from a Driver Board 10 to driver dual modules, in this case the Boards 12, 14. The signal is provided from sequential, or Combinational Logic 16, in front of point A, the point where an output signal splits to provide the identical drive to the dual Boards 12, 14. The last level on the driver board typically consists of driver gates, such as the Gates 16, 18, but this level may include any combinational gate as long as the two gates are identical. A "link" is defined as the 2 branches of logic and conductive foil lines between the point where the drives split (point A of FIG. 1) and the input pins (F and G) on the 2 dual boards.

A failure of a link has a very low probability of affecting more than one input signal on the dual boards, especially if the conductive foil for signals within a functional grouping are kept apart. The probability of failure for the driver gate is considerably higher than the probability of failure in the foil between the points D and F on the points E and G. This raises the probability of a link failure causing a single bit failure. The propensity of link failures to result in an error on only one input signal line is utilized in the present invention to check signals which do not lend themselves to the capture techniques described previously.

When two or more input signals in one parity grouping are from the same driver LSI, there is a higher probability of a multiple link failure because a surface type LSI failure could affect multiple output gates. In such a case the Parity Generator 45 can be replaced with a residue generator to increase the probability of detecting a multiple link failure.

The signals which may be checked may include miscellaneous control signals which are fed to the dual Boards 12, 14. These control signals may be completely independent of each other within groupings; and their values may be significant at more than one time. In fact, they sometimes may be significant every cycle of each instruction. These signals are coupled on links of the general type shown in FIG. 1, and they are used on the dual identical Boards 12, 14. Both boards must have identical values. The present invention then checks each input link.

Figure 2:
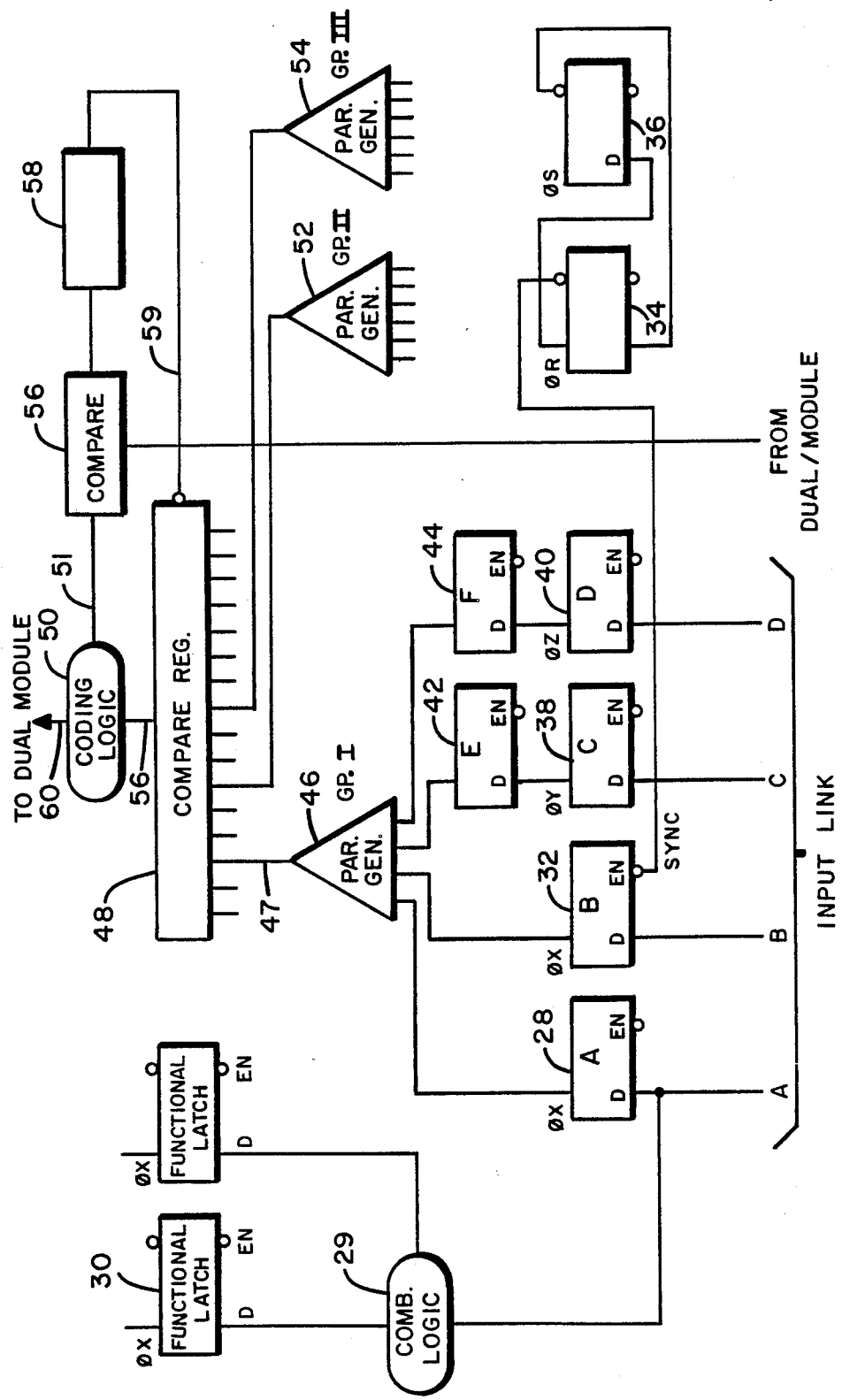
FIG. 2 is a schematic illustration of an embodiment of the present invention.

FIG. 2 shows a schematic of the input link capture and parity generator circuitry of one of the driven Boards 12 and 14 of the present invention. Input link A may feed through Combinatorial Logic 29 before being latched in one or more functional Latches 30; however, it is brought directly into a capture Latch 28 so that a fault can be isolated as close as possible to the input signal. Both Latches 28 and 30 are clocked on the same phase X.

Alternately, each of the Latches 32, 38, 40 are associated with functional latches which receive signals from different combinational logic circuits (not shown). Input Link B utilizes a similar Latch 32, but this latch is shown with a sync enable input. Latches 34, 36 which are clocked on phases R and S, respectively, show a typical method for generating the sync enable signal. Input links C and D utilize Latches 38, 40, respectively, which are clocked on phase Y and Z, respectively. They also use extra staging Latches 42, 44 which are clocked on phase X. (An alternative technique within the scope of the invention would be to generate their combined parity to a single latch.) The parity for the group of link inputs is generated in Parity Generator 46 at clock phase X and is sent to the Compare Register 48.

The compare register reads its inputs at clock phase W (where W is any phase except X). The previously described circuit Y is labelled Group I. The Parity Generator 46 thus supplies a signal on the line 47 that is a Group I parity signal. Signals from other functional latches and combinational latches may be developed in a manner similar to the circuitry described above for Group I so that other group parity signals may be coupled to the Compare Register 48. Two such representative Parity Generators 52, 54 are shown in the Figure.

The Compare Register 48 provides outputs on the Bus 56 to Encoding Logic 50 which encodes the input signals to provide a relatively small number of signals on the line 51 to the Comparator 56. For instance, the Encoding Logic 50 may be a residue code generator. The output of the Comparator 56 is coupled to the Error Latch 58 which is set on any clock phase except W when a miscompare occurs at the Comparator 56. The other input to the Comparator 56 on the line 57 is supplied from encoding logic circuitry on the other board of the dual board arrangement, and this circuitry is identical to the Encoding Logic 50. Therefore, when the encoded signals on the lines 51, 57 differ, the Latch 58 is set and locks out further inputs to the Compare Register 48 by disabling the enable line 59 when a miscompare error has occurred. The output of the Encoding Logic 50 is similarly sent to a comparator like the Comparator 56 on the line 60.

As noted above, when the error designator sets, it locks up the compare register; by comparing the values captured in the compare registers for both PC boards, it is easy to determine whether or not the input link parity signal caused the miscompare. If the compare register bits corresponding to the link parity do not miscompare, the links do not need to be considered in isolating the problem. If they do miscompare, the problem has been isolated to either one of the dual boards or one of the links (and their driver boards) in the group. For this case, it can be seen that, where pins permit, it is best to not combine links from different driver boards into the same group. However, where this is not possible, they may be grouped together.

The probability is much higher for an internal failure than for a link failure because of the number of gates involved, and the input link detect is most often used to prove the link did not fail. One distinct advantage of including the input link error detectors is that they provide a means of eliminating boards as possible failure points when a First Time Occurrence (FTO) software analysis routine is implemented. An FTO analysis utilizes the data captured at the time of failure rather than using predefined test software to attempt to repeat the failure.

While a particular embodiment has been described to illustrate the present invention, it will be apparent to those skilled in the art that, due to the nature of the invention, numerous variations of the invention may be readily devised from the teaching of this document which come within the scope of the claims to which the Applicant is entitled.

I claim:

1. A system for detecting and isolating failures of input signals that are supplied to a plurality of identical electronic module means, each of which receives said input signals from a common input means, wherein said module means each comprise clock means for supplying capture clock phase signals comprising a plurality of capture clock phase signals including a predetermined capture clock phase signal, a plurality of functional means coupled to said clock means each of which, upon the occurrence of said predetermined capture clock phase signal, captures a functional signal that is derived from an associated input signal, a plurality of link means coupled to said clock means each of which, upon the occurrence of said predetermined capture clock phase signal which resulted in the capture of an associated functional signal by an associated functional means, captures an input signal from which an associated functional signal was derived and provides a link output signal, encoding means coupled to said clock means and to a plurality of said link means which, upon the occurrence of one of said capture clock phase signals, provides an encoded signal representative of said link output signal; and wherein comparison means are coupled to said module means for receiving and for comparing said encoded signals of said plurality of module means and for producing an error signal when said encoded signals of said plurality of module means do not compare.

2. A system as claimed in claim 1 wherein said encoding means comprises a plurality of parity generator means each of which is coupled to a plurality of said link means for generating parity signals representative of said plurality of link means and said encoding means is coupled to said parity generation means for providing said encoded signal as a signal which is representative of said parity signals.

3. A system as claimed in claim 1 wherein said encoding means comprises storage means coupled to said parity generator means for storing said parity signals and lock-out means coupled to said comparison means for locking out further storage of said parity signals when said encoded signals of said plurality of module means do not compare.

4. A system as claimed in claim 3 wherein said encoding means comprises a plurality of parity generator means each of which is coupled to a plurality of said link means for generating parity signals representative of said plurality of link means and encoding means coupled to said parity generation means for providing said encoded signal as a signal which is representative of said parity signals.

* * * * *